Patented Aug. 1, 1944

2,354,776

UNITED STATES PATENT OFFICE 2,354,776

TERPENE RESIN

Alfred L. Rummelsburg, Wilmington, Del., assignor to Hercules Powder Company, Wilmington, Del., a corporation of Delaware No Drawing. Application June 14, 1941,
Serial No. 398,110

22 Claims. (Cl. 260—101)

This invention relates to new resinous compositions of matter and to processes for their production. More particularly, it relates to resins prepared by the copolymerization of a terpene with a resin acid or a resin acid ester.

Terpenes have been known to polymerize to products which vary in physical characteristics from viscous oils to soft resins at room temperature. Specifically, when dipentene or terpinene, dissolved in ethylene dichloride, is contacted with catalysts, such as, boron trifluoride, aluminum chloride, etc., for a period of 27 hours and at a temperature of 0° C. to 5° C., a polymerized product results which is a viscous oil. When alpha-pinene, on the other hand, is contacted with the same catalyst under similar conditions, except that a reaction period of 40 hours is employed, a soft resinous product results which has a drop melting point between about 30° C. and about 40° C. Other catalysts and varied conditions for the polymerization may be employed, however, it has been found impossible to produce appreciable yields of resins having drop melting points above 50° C. Use of such polymers in protective coating compositions is seriously handicapped by poor drying properties. While the use of these polymers as substitutes for ester gum gives improved resistance to discoloration under ultraviolet light and improved gas-proofness, etc., to protective coating compositions, the drying properties of the coating compositions are so inferior that they constitute a serious impediment to their commerical acceptability.

When terpenes are polymerized by the methods known in the art, the product consists of a mixture of polymerized terpenes in conjunction with a certain amount of unpolymerized or monomeric terpenes. The amount of monomeric material present will vary depending upon the procedures employed in accomplishing the polymerization. However, there is always an appreciable amount of monomeric material present. The removal of the monomer by vacuum distillation can be employed to yield products of higher melting points or heavier viscosities as the case may be. However, this constitutes an added cost item in the process.

It is an object of this invention to provide copolymer resins which possess generally heavier viscosities and higher melting points, as the case may be, as compared with the resinous terpene polymers prepared under similar conditions. It is a further object to provide copolymer resins which are solid at room temperature.

It is a further object to provide new copolymer resins in particularly high yields.

It is a further object to provide a process for the copolymerization of a terpene wherein the resulting product will contain a substantially lesser amount of monomeric terpene, as compared with the product obtained when the terpene is polymerized alone under similar conditions. In this connection, it is desired to provide a process for the copolymerization of a terpene wherein the resulting product will be substantially free of monomeric terpene.

A further object is to provide resinous copolymers which when incorporated into protective coatings will yield protective films having good drying characteristics. It is particularly desired to provide protective coatings having improved characteristics over protective coatings containing terpene polymers.

A further object is to provide copolymer resins which contain reactive groups capable of uniting with various other materials to yield more complex resins having desired characteristics.

Other objects will appear hereinafter.

In accordance with this invention, it has been found that various terpenes or mixtures thereof may be copolymerized with a resin acid or resin acid ester to yield a series of copolymer resins possessing novel and distinctive characteristics. The copolymerization reaction will be carried out by employing a polymerization catalyst, as for example, a metal halide, an acid, etc., under suitable operating conditions to be described hereinafter. The resulting products will be found to possess generally heavier viscosities or melting points, as the case may be, when compared with the terpene polymers prepared under similar reaction conditions. Thus, it is possible to prepare products which are viscous liquids or solids having melting points by the drop method of from about 20° C. up to about 160° C. The preferred copolymers are those having melting points between about 50° C. and about 120° C.

By employing the processes as disclosed herein, particularly high yields of copolymerized product result. In addition, the resulting product will be found to contain substantially lesser amounts of monomeric terpene, as compared with the product obtained when the terpene is polymerized alone under similar conditions. In many instances, the product resulting from the application of the processes of this invention will be found substantially free of monomeric terpene. Furthermore, it has been found that the copolymers prepared in accordance with the invention, when incorporated in protective coatings, impart good drying characteristics to the resulting protective films. They show a well-defined improvement over terpene polymers in this respect.

In accordance with this invention, one of the constituents of the mixture which is submitted to conditions of polymerization is a resin acid or an ester of a resin acid. The resin acids include the various grades of wood or gum rosin as well as the resin acids contained therein. Thus, besides the rosins, there may be used d-abietic acid, l-abietic acid, d-pimaric acid, l-pimaric acid, sapinic acid, sylvic acid, etc. Rosins which have been refined with selective solvents, as furfural, furfuryl alcohol, phenol, etc., or refined by treatment with adsorbents, as fuller's earth, activated charcoal, etc., are very desirable. If desired, the rosins may be heat treated or distilled either before or after treatment with selective solvents or adsorbents as indicated above.

The monohydric or polyhydric alcohol esters of the aforesaid rosins and resin acids may be used in place of the rosins or resin acids. Thus, for example, the monohydric alcohol esters, as the methyl, ethyl, propyl, isopropyl, butyl, oleyl, lauryl, stearyl, abietyl, hydrogenated abietyl, furfuryl, tetrahydrofurfuryl, allyl, isoamyl, phenyl, cyclohexyl, benzyl, bornyl, cetyl, fenchyl, alcohol esters, etc.; the polyhydric alcohol esters, as the ethylene glycol, diethylene glycol, triethylene glycol, glycerol, erythritol, pentaerythritol, dipentaerythritol, sorbitol, mannitol, etc., esters may be employed.

The terpene utilized in preparation of the copolymer resins will be any terpene hydrocarbon having the empirical formula $C_{10}H_{16}$, or a suitable mixture of said terpene hydrocarbons. Thus, for example, I may employ acyclic terpenes, such as, myrcene, ocimene, allo-ocimene, cryptotaenene, etc.; monocyclic terpenes, such as, dipentene, alpha-terpinene, beta-terpinene, gamma-terpinene, terpinolene, sylvestrene, alpha-phellandrene, beta-phellandrene, origanene, the pyronenes, etc.; bicyclic terpenes, such as, alpha-thujene, beta-thujene, sabinene, the carenes, alpha-pinene, beta-pinene, camphene, bornylene, alpha-fenchene, beta-fenchene, gamma-fenchene, etc.

In place of pure terpenes or their synthetic mixtures, it is possible to employ naturally-occurring terpene mixtures. Thus, for example, it is possible to employ either wood or gum turpentine. Wood turpentine consists primarily of alpha-pinene, whereas gum turpentine, depending upon its source, will contain varying proportions of alpha- and beta-pinene. Other fractions containing crude mixtures of various terpenes and obtained as a result of the recovery of oleoresinous material from pine wood may be employed. One such commercially available terpene-containing mixture is known as "Solvenol." This particular mixture contains the monocyclic terpene hydrocarbons, terpinene, terpinolene, and dipentene. Other terpene mixtures which may be employed are those obtained in the heat isomerization of alpha- and/or beta-pinene. When, for example, alpha-pinene is heated at elevated temperatures, it is possible to obtain products containing as much as 40% allo-ocimene along with substantial amounts of alpha-pinene, dipentene and other complex terpene products. Suitable pyrolysis of beta-pinene yields myrcene together with various monocyclic terpenes. Still further, it is possible to employ terpene mixtures obtained in the synthesis of ethers and alcohols from alpha- and beta-pinene. Any of these by-product mixtures containing substantial quantities of terpenes may be suitably employed as the terpene raw materials of the present invention.

In accordance with the present invention, then, a mixture of a terpene and a resin acid or resin acid ester, desirably in the presence of an inert solvent, is contacted with a polymerization or condensation catalyst at a temperature which promotes the copolymerization of the constituents for a period sufficiently long to secure a substantial yield of copolymerized product. Desirably, the reaction mixture will be vigorously agitated throughout the period of contact of the reactants with the catalyst.

The polymerization catalysts which will be employed in accordance with the invention can be categorized into two distinct groups. These groups comprise the metal halides, such as, boron trifluoride and its molecular complexes with ethers and acids, titanium chloride, ferric chloride, and the halides of metals whose hydroxides are amphoteric, as aluminum chloride, stannic chloride, zinc chloride, etc.; and acids such as, hydrofluoric acid, fluoroboric acid, polybasic mineral acids, as orthophosphoric acid, tetraphosphoric acid, sulfuric acid, etc. When acid catalysts are employed, it has been found that a sludge often forms during the polymerization reaction. This sludge may, if desired, be removed from the reaction mixture prior to treatment for removal of the catalyst. Under these conditions, paler colored products result.

Generally, in accordance with this invention, the catalyst to reactant ratio may vary between about 0.01 and about 1.0, but it is preferred to employ a ratio between about 0.05 and about 0.25. The operable temperature of reaction may vary between about $-20°$ C. and about 150° C., preferably between about 0° C. and about 40° C. The period of reaction required is quite variable, but, generally, between about 0.5 hour and about 48 hours is satisfactory, it being preferred to employ a reaction period between about 4 hours and about 24 hours.

In accordance with this invention the metal halide catalysts, particularly aluminum chloride, are preferred where the object is the production of resinous copolymers which are solid at room temperature. It is further preferred that when aluminum chloride is employed it will be employed in conjunction with a halogenated hydrocarbon solvent for the reactants. It has been found that when a metal halide catalyst is employed for the copolymerization, utilizing a catalyst to reactant ratio, a temperature and a reaction period within the broad operable ranges disclosed hereinabove, generally solid polymers will result. It will be understood, however, that although metal halides are preferably employed in producing resinous copolymers which are solid at room temperature in accordance with this invention, it is quite possible that solid polymers may result from the employment of the other catalysts disclosed herein.

The ratio of terpene to resin acid or resin acid ester may vary widely depending upon the particular compounds under consideration and the desired characteristics of the product. Generally, however, it is preferred to employ the terpene in an amount between about 10% and about 75% of the total weight of the reactants, with the resin or resin acid ester being employed in a corresponding amount of between about 90% and about 25% of the total weight of the reactants. The best results are obtained where the amount of terpene employed is between about 33% and about 60%, with the corresponding amount of resin acid or resin acid ester between about 67% and about 40%.

The inert solvents which may be employed in accordance with this invention generally comprise any organic liquid which is inert to the reactants and catalyst employed. Thus, aliphatic hydrocarbons, such as, gasoline, petroleum naphtha, butane, pentane, etc.; aromatic hydrocarbons, such as, benzene, toluene, xylene, etc.; cyclic hydrocarbons, such as, cyclohexane, decahydronaphthalene, etc.; esters, such as, methyl acetate, ethyl acetate, propyl acetate, isopropyl acetate, n-butyl acetate, etc.; halogenated hydrocarbons, such as, chloroform, ethylene dichloride, carbon tetrachloride, trichloroethylene, ethyl chloride, methylene chloride, etc., may be employed. Generally, the aromatic hydrocarbon solvents are the preferred solvents. However, there is an exception in the case of aluminum chloride where the halogenated hydrocarbons, and particularly ethylene dichloride, are most preferred.

Following the reaction period, the reaction mixture will be treated to remove the catalyst. Generally, this will be accomplished by water washing. However, where the catalysts, stannic chloride or aluminum chloride have been used, it is preferred to wash the reaction mixture first with aqueous inorganic acids, as hydrochloric acid, sulfuric acid, etc., solutions. Thereby, catalyst-copolymer complexes are more readily decomposed, after which the reaction mixture will be water washed. Finally, the solvent will be removed by reduced pressure or steam distillation.

The color of the final products may be improved by utilizing terpenes which have been distilled from caustic. Also, the use of an inert atmosphere such as $CO_2$, $N_2$, etc., during the reaction period leads to the production of pale colored products. Further refinement of the products may be accomplished by treatment with adsorbents such as silica gel, fuller's earth, bauxite, activated carbon, activated magnesium and aluminum silicates, etc. This treatment removes traces of combined catalysts and further bleaches the products. It may be applied either before or after removal of the solvent. Other refining agents which may be employed include selective solvents, such as, furfural, furfuryl alcohol, phenol, etc. If desired, the copolymer resins obtained in accordance with the processes described herein may be subjected to vacuum distillation to remove the more volatile products of the copolymerization, leaving copolymer residues having higher melting points than the initial copolymerization product.

There follow several specific examples which illustrate particular embodiments of the principles of this invention which, however, are in no way to be construed as being limiting. All parts and percentages in this specification and claims are by weight unless otherwise indicated.

Example 1

Gaseous boron trifluoride was introduced into a solution of 200 parts of I wood rosin and 95 parts of dipentene in 300 parts of benzene until 25 parts of the boron trifluoride were absorbed. The temperature of the solution during absorption was maintained at 15° C. to 43° C., and vigorous agitation was employed. The homogeneous reaction mixture was then allowed to stand for about 20 hours at 20° C., after which it was thoroughly washed with water. The benzene and unreacted dipentene were then removed by distillation at reduced pressure, employing a maximum bath temperature of about 235° C. and a pressure of 5 mm. Two hundred and sixty-seven parts of a resinous copolymer remained having an acid number of 86.8, a drop melting point of 96° C., and a thiocyanogen number of 50.

Example 2

Twenty-two parts of anhydrous $SnCl_4$ were added to a solution of 150 parts of I wood rosin and 75 parts of allo-ocimene (90% pure) in 260 parts of toluene. During the addition, the ingredients were agitated and cooled to maintain a temperature of about 10° C. After standing at 25 to 30° C. for a period of 18 hours, the homogeneous solution was washed with 1000 parts of aqueous 10% HCl and then washed with water. The toluene and unreacted constituents were removed by reduced pressure distillation employing a final bath temperature of 190 to 200° C. and a pressure of 15 mm. There resulted 215 parts of a copolymer resin having an acid number of 109, a drop melting point of 95° C. and a color of F on the rosin scale.

Example 3

A quantity of ester gum was prepared by reacting N wood rosin with glycerin. The resulting product had an acid number of 7 and a drop melting point of 88° C. Fifty parts of this ester gum and 100 parts of commercial beta-pinene were dissolved in 200 parts of benzene. The beta-pinene employed contained 85% beta-pinene and 15% alpha-pinene. The resulting solution was treated with gaseous boron trifluoride for 40 minutes with accompanying agitation and cooling to maintain a temperature of 10° C. to 15° C. As a result, 5.5 parts of boron trifluoride were absorbed. After standing for 21 hours at 0° C. to 5° C., the reaction mixture was washed with water heated to 60° C. The benzene and unreacted constituents were removed as in Example 2. There remained 145 parts of a copolymer resin having an acid number of 3, a drop melting point of 84° C. and a color of N on the rosin scale.

Example 4

One hundred parts of the same ester gum as employed in Example 3 and 160 parts of dipentene were dissolved in 220 parts of benzene. The dipentene employed contained a maximum of 25% para-cymene as an impurity. The resulting solution was treated with gaseous boron trifluoride for a period of 1 hour with continuous agitation and cooling to maintain a temperature of 10° C. to 15° C. During this period, 12 parts of boron trifluoride were absorbed. After standing for 22 hours at 0 to 5° C., the reaction mixture was washed with water at 60° C. The benzene and unreacted constituents were removed by reduced pressure distillation, employing a final bath temperature of 190 to 200° C. and a pressure of 15 mm. Two hundred and twelve parts of a resinous material remained having an acid number of 3, a drop melting point of 70° C., and a color of K on the rosin scale.

Example 5

One hundred parts of N wood rosin and 200 parts of alpha-pinene were dissolved in 350 parts of ethylene dichloride. Thirty parts of anhydrous AlCl₃ were added over a period of 1 hour with agitation and cooling to maintain a temperature of 10° C. to 15° C. The reaction mixture was allowed to stand at this temperature for a period of 60 hours, and was then steam distilled from 2100 parts of boiling aqueous 10% $H_2SO_4$ in order to remove the ethylene dichloride. The residue was redissolved in 400 parts of benzene, and washed with water at 60° C. The benzene was removed by reduced pressure distillation, employing a final bath temperature of 190 to 200° C. and a pressure of 15 mm. There remained 280 parts of a resinous material having an acid number of 48, a drop melting point of 68° C. and a color of I on the rosin scale.

Example 6

Crystalline resin acids were prepared in the following manner: 1000 parts of N wood rosin were dissolved in 440 parts of 95% ethyl alcohol with agitation and refluxing at 80 to 90° C. The solution was cooled to 25 to 30° C. over 0.5 hour with agitation and then seeded with several crystals of abietic acid. Agitation was continued for 3 hours at 25 to 30° C., and the mixture was then centrifuged to separate the crystals from the mother liquor. The crystals were washed while in the centrifuge with 200 parts of 95% ethyl alcohol. The crystals were fused at 190 to 200° C. while sparging with carbon dioxide. There remained 280 parts of fused resin acids having an acid number of 183, a drop melting point of 96° C., and a color of X+ on the rosin scale.

One hundred parts of alpha-pinene and 100 parts of the above fused resin acids were dissolved in 250 parts of benzene. The resulting solution was treated with 10 parts of gaseous boron trifluoride over a period of 1.0 hour with agitation while maintaining the temperature at 10 to 15° C. The reaction mixture was allowed to stand for 24 hours at 0 to 5° C. and then water washed. The solvent and unreacted constituents were removed by means of reduced pressure distillation, employing a final bath temperature of 190 to 200° C. and a pressure of 15 mm. There remained 195 parts of copolymer resin having an acid number of 84, a drop melting point of 113° C. and a color of G+ on the rosin scale.

The copolymer resins of this invention are very useful in the form of their clear solutions in the lacquer, varnish and adhesive fields. They may also be used in the formulation of pigmented coating compositions, such as, paints, pigmented lacquers for wood, metal, paper, etc. Unpigmented solutions or emulsions of the resins are suitable for impregnating or coating paper, textiles, fibers, wood, etc. They may also be employed in the manufacture of soap.

When copolymer resins are prepared in accordance with this invention by the use of rosin or resin acids, the resulting products may be esterified with mono- and polyhydric alcohols. Resinous esters result which are useful in adhesives and as textile impregnation agents. Copolymer resins which have been completely or partially neutralized with lime, calcium acetate, zinc oxide, or zinc acetate may be used in protective coatings. The alkali metal and ammonium salts act as emulsifying agents.

The solubility characteristics of the copolymer resins of this invention are such that they may be dissolved in common solvents, such as, benzene, gasoline, chlorinated hydrocarbons, cyclohexane, etc. They are somewhat less soluble in solvents, such as, ethyl alcohol, acetone, etc.

It will be understood that the details and examples hereinbefore set forth are illustrative only and that the invention as broadly described and claimed is in no way limited thereby.

What I claim and desire to protect by Letters Patent is:

1. The process which comprises copolymerizing a mixture consisting of a terpene and a material selected from the group consisting of rosin, rosin acids, rosin esters and rosin acid esters in the presence of a polymerization catalyst selected from the group consisting of boron trifluoride and its molecular complexes with ethers and acids, titanium chloride, ferric chloride, aluminum chloride, stannic chloride, zinc chloride, hydrofluoric acid, fluoboric acid, orthophosphoric acid, tetraphosphoric acid, and sulfuric acid.

2. The process which comprises copolymerizing a mixture consisting of a terpene and a material selected from the group consisting of rosin, rosin acids, rosin esters and rosin acid esters, in the presence of a polymerization catalyst selected from the group consisting of boron trifluoride and its molecular complexes with ethers and acids, titanium chloride, ferric chloride, aluminum chloride, stannic chloride, zinc chloride, hydrofluoric acid, fluoboric acid, orthophosphoric acid, tetraphosphoric acid, and sulfuric acid, at a temperature between about −20° C. and about 150° C.

3. The process which comprises reacting rosin with a terpene in the presence of a boron halide condensing agent; whereby a reaction product is obtained which is characterized by the complete solubility of its alkali salt in water.

4. The process which comprises copolymerizing a mixture consisting of a terpene and a material selected from the group consisting of rosin, rosin acids, rosin esters, and rosin acid esters in the presence of boron trifluoride at a temperature between about −20° C. and about 150° C.

5. The process which comprises copolymerizing a mixture consisting of a terpene and a material selected from the group consisting of rosin, rosin acids, rosin esters, and rosin acid esters in the presence of boron trifluoride at a temperature between about 0° C. and about 40° C.

6. The process which comprises copolymerizing a mixture consisting of a terpene and a material selected from the group consisting of rosin, rosin acids, rosin esters, and rosin acid esters, both of which reactants are dissolved in an inert solvent in the presence of boron trifluoride at a temperature between about 0° C. and about 40° C.

7. The process which comprises copolymerizing a mixture consisting of a terpene and a material selected from the group consisting of rosin, rosin acids, rosin esters, and rosin acid esters in the presence of hydrofluoric acid at a temperature between about −20° C. and about 150° C.

8. The process which comprises copolymerizing a mixture consisting of a terpene and a material selected from the group consisting of rosin, rosin acids, rosin esters, and rosin acid esters in the presence of hydrofluoric acid at a temperature between about 0° C. and about 40° C.

9. The process which comprises copolymerizing a mixture consisting of a terpene and a material selected from the group consisting of rosin, rosin acids, rosin esters, and rosin acid esters in the presence of zinc chloride at a temperature between about —20° C. and about 150° C.

10. The process which comprises copolymerizing a mixture consisting of a terpene and a material selected from the group consisting of rosin, rosin acids, rosin esters, and rosin acid esters in the presence of zinc chloride at a temperature between about 0° C. and about 40° C.

11. A copolymer consisting of a terpene and a material selected from the group consisting of rosin, rosin acids, rosin esters, and rosin acid esters.

12. A copolymer consisting of an acyclic terpene and a material selected from the group consisting of rosin, rosin acids, rosin esters, and rosin acid esters.

13. A copolymer consisting of a monocyclic terpene and a material selected from the group consisting of rosin, rosin acids, rosin esters, and rosin acid esters.

14. A copolymer consisting of a bicyclic terpene and a material selected from the group consisting of rosin, rosin acids, rosin esters, and rosin acid esters.

15. A copolymer consisting of an acyclic terpene and rosin.

16. A copolymer consisting of a monocyclic terpene and rosin.

17. A copolymer consisting of a bicyclic terpene and a rosin ester.

18. A copolymer consisting of a bicyclic terpene and a glycerol ester of rosin.

19. A copolymer consisting of allo-ocimene and rosin.

20. A copolymer consisting of dipentene and rosin.

21. A copolymer consisting of beta-pinene and the glycerol ester of rosin.

22. The process which comprises copolymerizing a mixture consisting of a terpene and a material selected from the group consisting of rosin, rosin acids, rosin esters and rosin acid esters, in the presence of a polymerization catalyst selected from the group consisting of boron trifluoride and its molecular complexes with ethers and acids, titanium chloride, ferric chloride, aluminum chloride, stannic chloride, zinc chloride, hydrofluoric acid, fluoboric acid, orthophosphoric acid, tetraphosphoric acid, and sulfuric acid, and treating the copolymerized material with a refining agent selected from the group consisting of adsorbents and selective solvents.

ALFRED L. RUMMELSBURG.